(12) United States Patent
Almudafar-Depeyrot et al.

(10) Patent No.: US 10,586,079 B2
(45) Date of Patent: Mar. 10, 2020

(54) PARAMETRIC ADAPTATION OF VOICE SYNTHESIS

(71) Applicant: SoundHound, Inc., Santa Clara, CA (US)

(72) Inventors: Monika Almudafar-Depeyrot, Menlo Park, CA (US); Bernard Mont-Reynaud, Sunnyvale, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 161 days.

(21) Appl. No.: 15/406,213

(22) Filed: Jan. 13, 2017

(65) Prior Publication Data

US 2018/0182373 A1 Jun. 28, 2018

Related U.S. Application Data

(60) Provisional application No. 62/438,873, filed on Dec. 23, 2016.

(51) Int. Cl.
*G10L 13/033* (2013.01)
*G10L 13/10* (2013.01)
(Continued)

(52) U.S. Cl.
CPC .............. *G06F 40/30* (2020.01); *G10L 13/00* (2013.01)

(58) Field of Classification Search
CPC ... G06F 17/2785; G10L 13/00; G10L 13/033; G10L 13/047; G10L 13/10
See application file for complete search history.

(56) References Cited

U.S. PATENT DOCUMENTS

| 5,749,071 A | * | 5/1998 | Silverman | ............... | G10L 13/10 |
| | | | | | 704/258 |
| 6,035,273 A | * | 3/2000 | Spies | ..................... | G10L 15/07 |
| | | | | | 704/235 |

(Continued)

OTHER PUBLICATIONS

Miquel Febrer, et al., Aneto: a tool for prosody analysis of speech, 1998.

(Continued)

*Primary Examiner* — Angela A Armstrong
(74) *Attorney, Agent, or Firm* — David R. Stevens; Stevens Law Group

(57) ABSTRACT

Software-based systems perform parametric speech synthesis. TTS voice parameters determine the generated speech audio. Voice parameters include gender, age, dialect, donor, arousal, authoritativeness, pitch, range, speech rate, volume, flutter, roughness, breath, frequencies, bandwidths, and relative amplitudes of formants and nasal sounds. The system chooses TTS parameters based on one or more of: user profile attributes including gender, age, and dialect; situational attributes such as location, noise level, and mood; natural language semantic attributes such as domain of conversation, expression type, dimensions of affect, word emphasis and sentence structure; and analysis of target speaker voices. The system chooses TTS parameters to improve listener satisfaction or other desired listener behavior. Choices may be made by specified algorithms defined by code developers, or by machine learning algorithms trained on labeled samples of system performance.

25 Claims, 15 Drawing Sheets

(51) Int. Cl.
*G06F 40/30* (2020.01)
*G10L 13/00* (2006.01)

(56) References Cited

U.S. PATENT DOCUMENTS

| | | | | |
|---|---|---|---|---|
| 6,876,968 B2* | 4/2005 | Veprek | .................. | G10L 13/033 704/258 |
| 7,110,951 B1* | 9/2006 | Lemelson | ................ | H04R 5/04 704/270 |
| 7,277,855 B1* | 10/2007 | Acker | .................... | G10L 13/02 704/260 |
| 7,305,340 B1* | 12/2007 | Rosen | .................. | G10L 13/033 704/258 |
| 7,865,365 B2* | 1/2011 | Anglin | .................... | G10L 17/26 704/257 |
| 8,914,290 B2* | 12/2014 | Hendrickson | ........... | G10L 13/02 704/260 |
| 2003/0078780 A1 | 4/2003 | Kochanski et al. | | |
| 2004/0148172 A1 | 7/2004 | Cohen et al. | | |
| 2004/0267524 A1* | 12/2004 | Boillot | .................... | G10L 21/04 704/205 |
| 2005/0060158 A1* | 3/2005 | Endo | ........................ | G10L 15/22 704/275 |
| 2005/0071163 A1 | 3/2005 | Aaron et al. | | |
| 2006/0229873 A1 | 10/2006 | Eide et al. | | |
| 2007/0100628 A1 | 5/2007 | Bodin et al. | | |
| 2009/0063141 A1 | 5/2009 | Huang | | |
| 2010/0057465 A1 | 3/2010 | Kirsch et al. | | |
| 2012/0265533 A1* | 10/2012 | Honeycutt | ............ | G10L 13/033 704/260 |
| 2013/0289998 A1* | 10/2013 | Eller | ....................... | G10L 13/08 704/260 |
| 2014/0025383 A1 | 1/2014 | Dai et al. | | |
| 2016/0210959 A1* | 7/2016 | Efrati | .................... | G10L 21/003 |
| 2016/0210985 A1 | 7/2016 | DeLeeuw | | |
| 2016/0379638 A1 | 12/2016 | Basye | | |
| 2017/0244834 A1* | 8/2017 | Flores | ................. | H04M 3/4936 |

OTHER PUBLICATIONS

Ivan Bulyko, et al., On the relative importance of different prosodic factors for improving speech synthesis, International Congress of Phonetic Sciences, 1999.

Wael Hamza, et al., The IBM Expressive Speech Synthesis System, 2004, IBM.

ESpeak Voice Files documentation, http://espeak.sourceforge.net.

Klatt Synthesizer Parameters documentation, http://linguistics.berkeley.edu.

DRSpeech documentation, http://www.drspeech.com.

Kayoko Yanagisawa, et al., Noise Robustness in HMM-TTS Speaker Adaptation, 8th ISCA Speech Synthesis Workshop, Aug. 31-Sep. 2, 2013, pp. 119-124, Barcelona, Spain.

Timothy Bickmore, et al., Relational Agents: A Model and Implementation of Building User Trust, Proceedings of the ACM SIGCHI Conference on Human Factors in Computing Systems (CHI), pp. 396-403. Mar. 31-Apr. 5, 2001, Seattle, Washington.

Jean-Julien Aucouturier, et al., Covert digital manipulation of vocal emotion alter speakers' emotional states in a congruent direction, Proceedings of the National Academy of Sciences of the United States of America, 2015, pp. 948-953, vol. 113 No. 4.

* cited by examiner

```
if (listener_gender == FEMALE)
   pitch = LOW_PITCH
else
   pitch = HIGH_PITCH
```

(a)

```
F1_freq_min = 240 - 40 * noise_level
```

(b)

```
if(domain == BRICKLAYING)
   voice_gender = MALE
else
   voice_gender = FEMALE
```

PARAMETRIC ADAPTATION OF VOICE SYNTHESIS

CROSS REFERENCE TO RELATED APPLICATIONS

This application claims the benefit of U.S. Provisional Application Ser. No. 62/438,873, entitled "Parametric Adaptation Of Voice Synthesis," filed Dec. 23, 2016, the disclosure of which is incorporated herein by reference in its entirety.

FIELD OF THE INVENTION

The present invention is in the field of computer-based speech synthesis.

BACKGROUND

Research shows that certain voices are more pleasant to listeners and that the preference varies by listener. Advertisers know that certain voices are more successful for selling, and furthermore that the best voice for selling is different from one product to another. Previous work on voice adaptation attempted to make a speech output sound like a particular person.

This application provides an improved approach for adapting a voice to a particular customer for improving effectiveness of advertising.

SUMMARY OF THE INVENTION

Current systems for voice adaptation do not configure a voice for best pleasantness, for improved selling, or in other ways adaptive and reactive to particular user profiles, particular situations, or particular speech semantics. Furthermore, conventional systems do not aid in finding improved configurations.

The present disclosure is directed to systems, methods, and computer software code for voice adaptation. Various embodiments provide for configuring a synthetic voice for best pleasantness, for improved selling, and in other ways adaptive and reactive to particular user profiles, particular situations, and particular speech semantics. Various embodiments provide for testing and analysis to find improved configurations.

Some embodiments use concatenative speech synthesis. Some embodiments use fully parametric synthesis. Some embodiments configure TTS (text to speech) voice parameters based on particular attributes. Some embodiments include speaker voice analysis. Some embodiments store TTS voice parameters in user profiles. Some embodiments use attributes stored in user profiles. Some embodiments use situational attributes. Some embodiments use semantic attributes. Some embodiments determine TTS parameters by applying functions to attributes. Some functions use formulas. Some functions use algorithms. Some functions use models trained by machine learning techniques. Some embodiments assign a worth value to each behavior of listeners in order to train or update models. Various parameters and various attributes are appropriate for various embodiments.

BRIEF DESCRIPTION OF THE DRAWINGS

FIG. 9 illustrates example rules for assigning parameters for parametric speech synthesis according to relevant attributes.

DETAILED DESCRIPTION

Throughout this disclosure, the term attribute refers to inherently present aspects of things, such as a person's gender or age. Any particular thing has a value for each attribute, such as 25 years for an age and female for a gender. Parameters are the configurable aspects of things that are configurable, such as the baseline pitch and the range of a synthesized voice. Parameters have attributes, such as 240 hertz for a baseline pitch and 2 octaves for a range. Modules, as described in this disclosure, are pieces of hardware or software. The type of implementation of one module need not be the same as that of any other module.

Many methods of speech synthesis, also known as text-to-speech (TTS) are well known. Speech synthesis can be concatenative, which requires many recorded data samples and therefore much data storage. Speech synthesis can be fully parametric, which requires little data and is adaptable in more dimensions and over greater ranges. Hybrid methods between concatenative synthesis and parametric synthesis are also appropriate. Articulatory methods, in which parameters apply to models of the human vocal tract, are also appropriate.

Speech synthesis consumes text, and produces a sequence of audio samples that represent the corresponding speech audio. Various embodiments respond to text in many formats, such as text readable by humans, text marked up with meta-data, and symbolic representations of phonemes.

Figure 1:
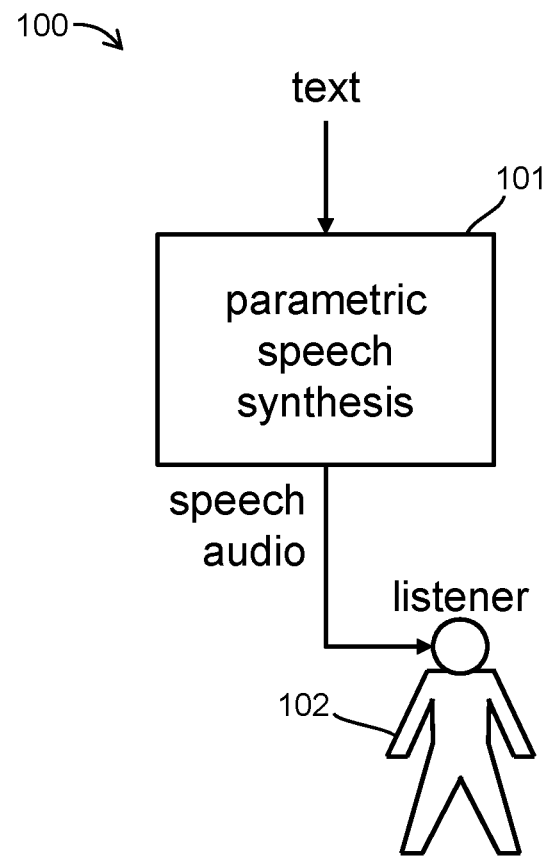
FIG. 1 illustrates conventional parametric speech synthesis.

FIG. 1 shows a speech synthesis system 100 and its operation. A parametric speech synthesis module 101 consumes input text and produces speech audio according to a set of internal parameters. A listener 102 hears the speech audio.

Figure 2:
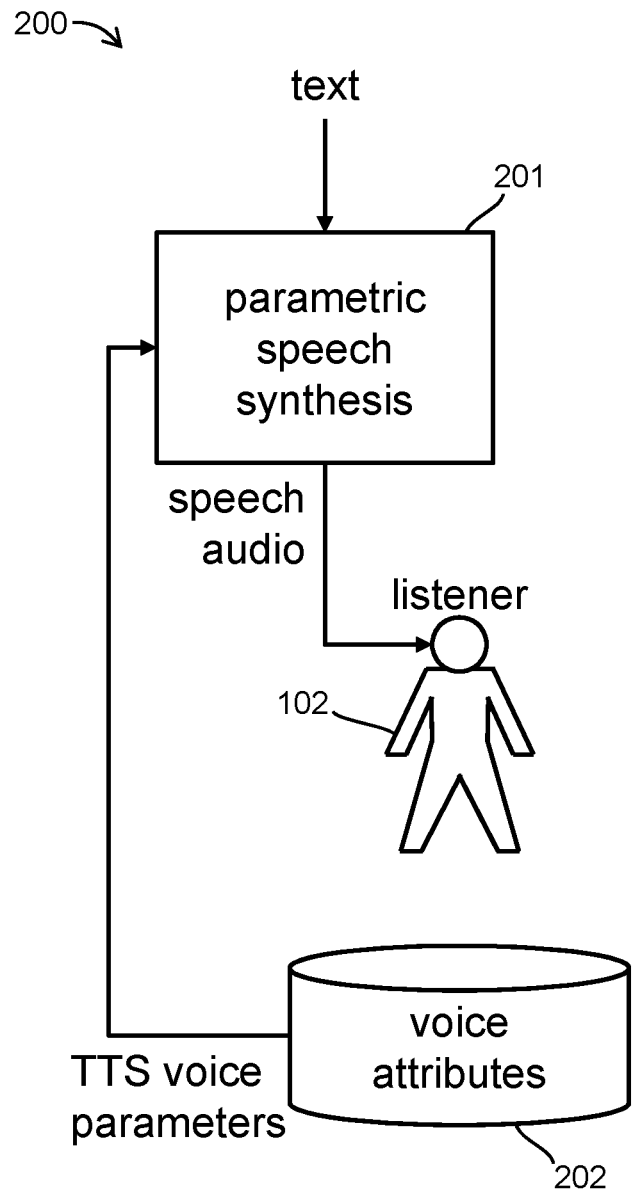
FIG. 2 illustrates parametric speech synthesis according to TTS voice attributes.

Some systems allow voice designers to configure the voice. FIG. 2 shows such an embodiment of a speech system 200 and its operation. A parametric speech synthesis module 201 consumes input text and produces speech audio according to a set of TTS voice parameters. A listener 102 hears the speech audio.

The system uses internal default values for each parameter, unless an external voice description overrides the parameter value with an external TTS voice parameter, in which case the system uses the value of the external TTS voice parameter. In the embodiment of FIG. 2, the TTS voice parameters come directly from a set of voice attributes 202. Various formats and methods are appropriate to represent, store, and transmit voice attributes, such as values, stored in text files on a non-transitory computer readable medium, and transferred through a transitory computer readable medium to a computer.

In various embodiments, TTS systems may have different application programming interfaces (APIs) and accept different sets of parameters. Some systems take as input a sentence type (declarative, interrogative, imperative, exclamatory, optative) and use it to configure sentence prosody. Some TTS embodiments, notably concatenative and hybrid TTS systems, offer prepackaged voices with human-sounding names such as Siri from Apple, Alexa from Amazon, and Samantha from Nuance; these have predefined internal parameter values. Some other TTS systems, including parametric synthesis TTS and sometimes hybrid TTS, are more flexible and can accept as input high-level parameters such as the gender of the voice, an age, a dialect, and a speech rate, from which they derive lower level parameters. Some TTS systems accept mid-level parameters such as pitch range or volume range. Some TTS systems take as input very low-level parameters such as flutter, roughness, breath, formant frequency, formant bandwidth, formant amplitude, nasal DSP parameters, which are generated from higher-level parameters.

Some TTS systems allow markup in the input text to provide fine control over prosody, including phrase level accents, intonation, word emphasis, and pitch contours. Some systems accept affect high-level emotional tags (modifiers) that represent positions along the emotional continuum (a two-dimensional space based on Positive-Negative and Active-Passive axes) such as joy, sadness, anger, fear, and boredom. Submissive and authoritative tones can also be created. Some systems give control of the level of articulation. Some TTS systems accept a combination of parameter levels, where lower-level parameter values may combine with, or override, values derived from higher-level parameters.

Speaker Voice Analysis

Figure 3:
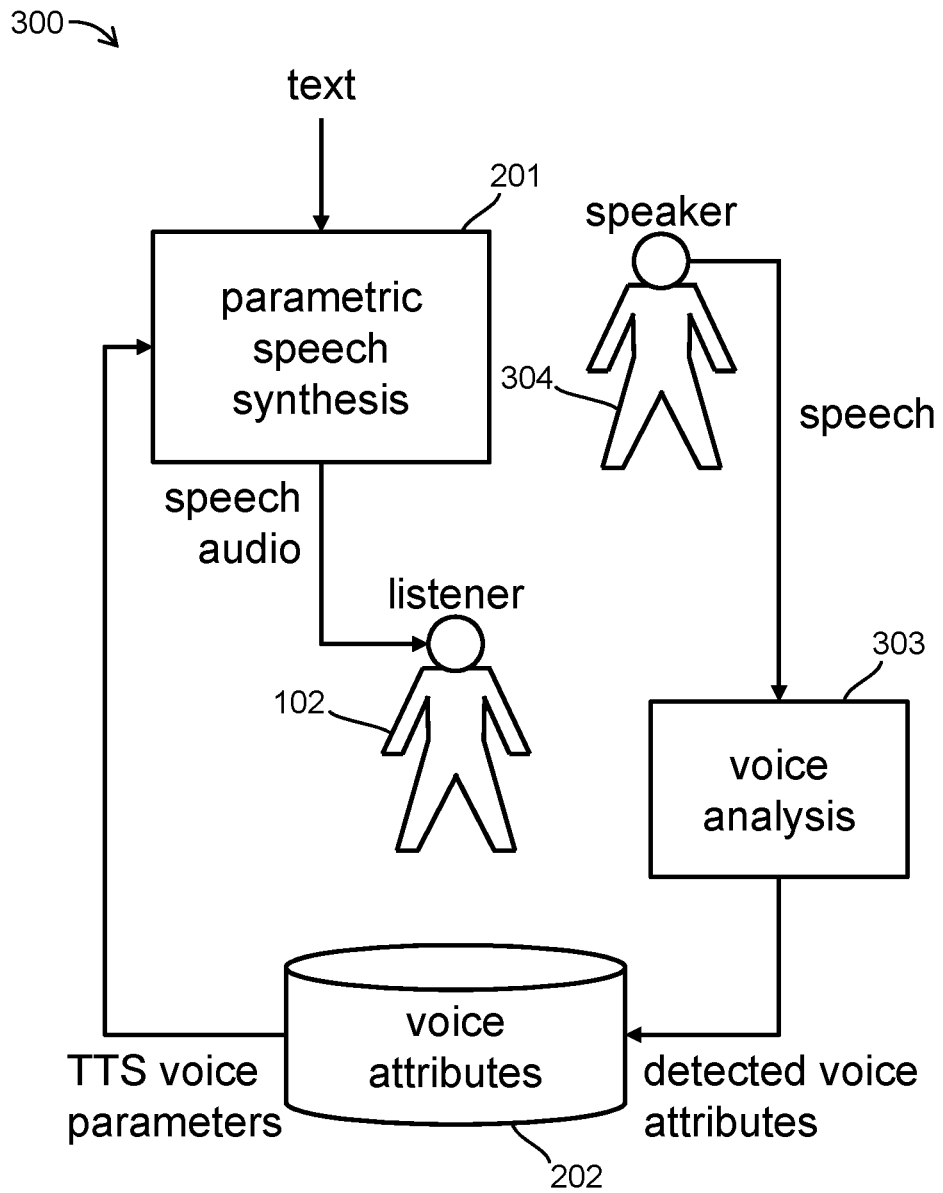
FIG. 3 illustrates parametric speech synthesis for mimicking a speaker's voice.
Figure 12:
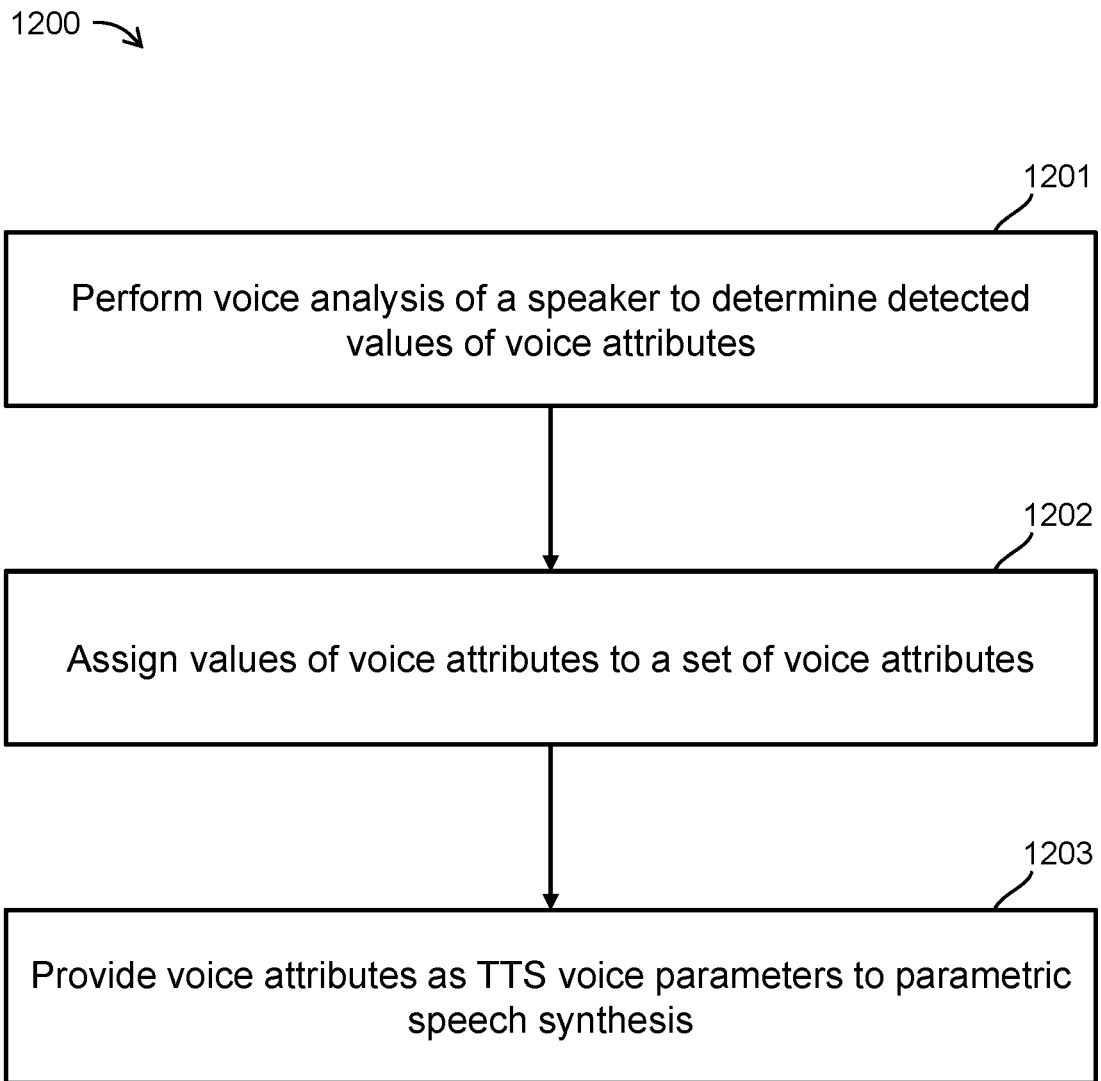
FIG. 12 illustrates a process for assigning TTS voice attributes to mimic a particular speaker's voice.

Some embodiments attempt to make a voice sound like a particular speaker. FIG. 3 shows such an embodiment of a speech system 300 and its operation. A parametric speech synthesis module 201 consumes input text and operates according to a set of TTS voice parameters to produce speech audio for a listener 102. The speech synthesis is according to a set of TTS voice parameters from a set of voice attributes 202. The system assigns values of voice attributes to the set of voice attributes 202 by performing a voice analysis in a voice analysis module 303. The voice analysis produces detected voice attributes and consumes speech. The speech comes from a speaker 304. FIG. 12 shows a process of using the embodiment of FIG. 3. First, the system performs voice analysis of a speaker to determine detected values of voice attributes 1201. Next, the system assigns values of voice attributes to a set of voice attributes 1202. Finally, the system provides voice attributes as TTS voice parameters to parametric speech synthesis 1203.

The system of FIG. 3 is useful for creating particularly interesting voices. For example, by analyzing the voice of James Earl Jones the system can produce synthesized speech in his voice. Likewise, systems can mimic the voices of Oprah Winfrey, Bart Simpson, or Darth Vader. Some embodiments allow customers to provide recordings of their own voice or the voice of friends or relatives and produce custom TTS voices for personal computers, mobile devices, and robots. This allows for entertaining, sentimental and therapeutic uses of computer generated voices that sound like specific people.

Some embodiments use speech from listener 102 for the source input to the voice analysis 303. By performing analysis on a significantly large amount of speech, the voice attributes 202 enable the speech synthesis 201 to produce speech audio that resembles the sound of a user's voice. In the systems of interest, the voice analysis 303 is not done on an utterance basis; it requires a substantial amount of data from speaker 304.

Some systems further provide an ability to customize parameters to change the sound of a user's voice for novelty or educational effects. One such customization causes an extreme increase in the voice pitch so that it sounds like the system is speaking in the voice of the user as if the user has inhaled helium. One such customization deepens the lower voice formants slightly, and sharpens phoneme transitions in order to provide a user the sound of their own voice with a more authoritative tone and more clear enunciation. This can help users train to give powerful lectures or speeches.

Adaptation Based on User Profile

A user profile is a set of attributes applicable to a person or a class of people. Typical user profiles include attributes such as gender, age range, ethnicity, and musical interests. Whereas such information is applicable to classes of people, some user profiles include information that is specific to a particular person, such as a birth date and home location. Whereas such information is essentially static, some user profiles include dynamic information, such as a current location and musical interests.

Figure 4:
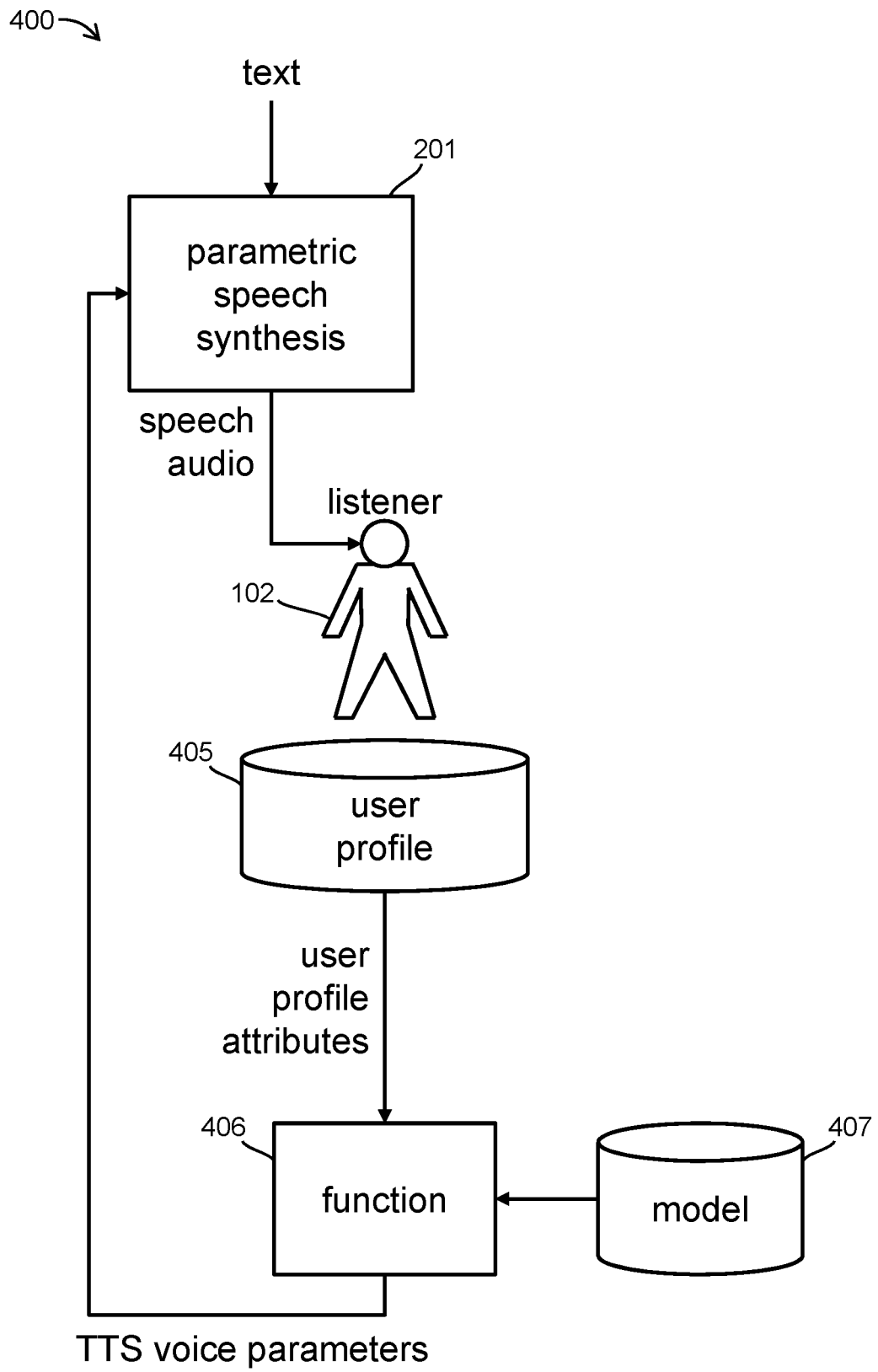
FIG. 4 illustrates parametric speech synthesis responsive to attributes stored in a user profile.
Figure 13:
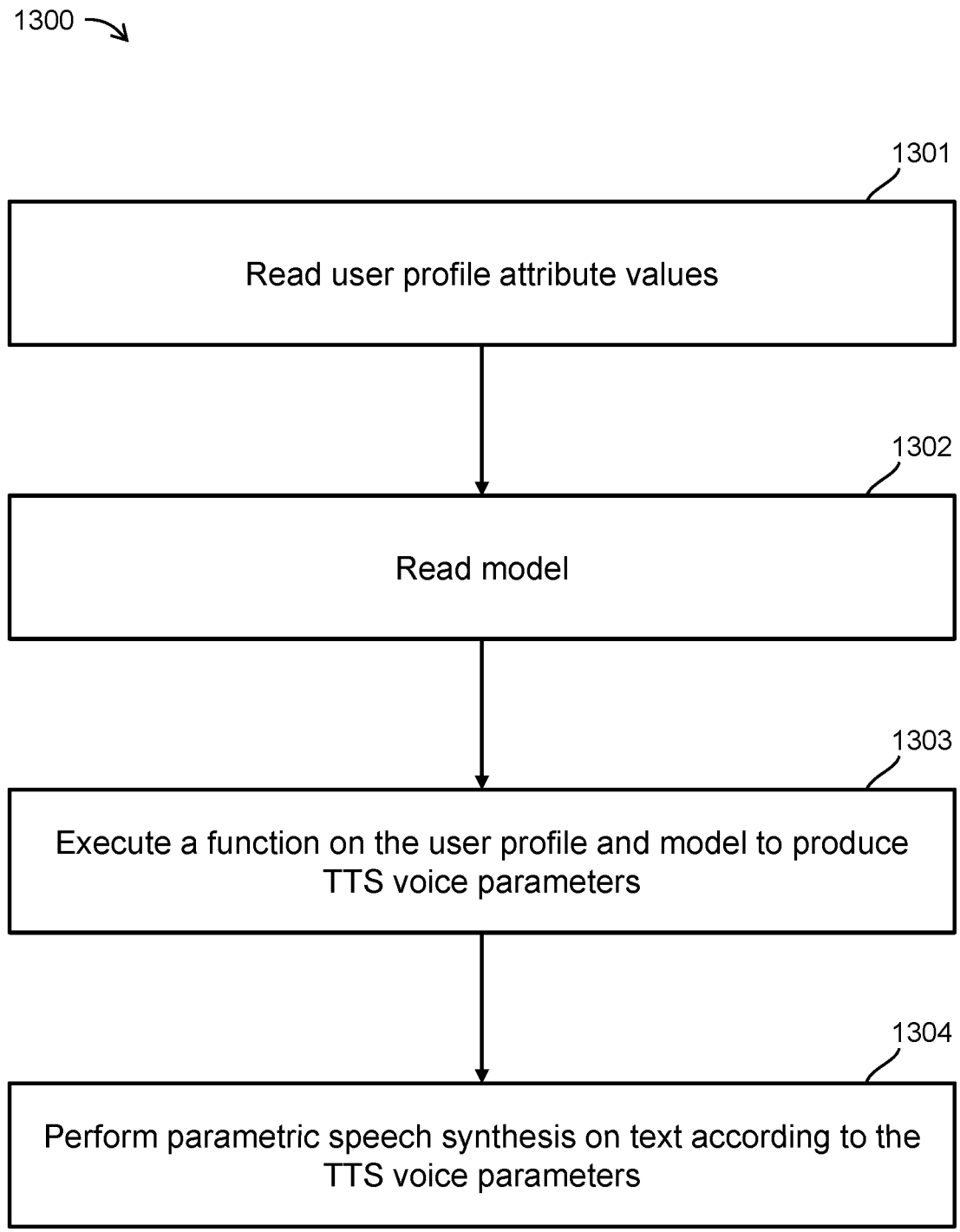
FIG. 13 illustrates a process for synthesizing speech according to a model of user profile attributes.

Some embodiments store TTS voice parameters within user profiles, such as TTS voice parameters described above with respect to FIG. 3. FIG. 4 shows such an embodiment of a speech system 400 and its operation. A parametric speech synthesis module 201 consumes input text and, according to a set of TTS voice parameters, produces speech audio for a listener 102. A function module 406 produces the TTS voice parameters. The function does so by transforming user profile attributes from a user profile 405 according to a model 407. FIG. 13 shows a process 1300 of using the embodiments of FIG. 4. First, the system reads user profile attribute values 1301. Next, the system reads a model 1302. Next, it executes a function on the user profile and model to produce TTS voice parameters 1203. Finally, the system performs parametric speech synthesis on text according to the TTS voice parameters 1304.

In various embodiments, system designers or system users are able to configure the TTS voice parameters in the user profile. In some embodiments, a default dialect exists for voice synthesis in each language or country. A system designer tunes the TTS voice parameters for particular dialects in those countries. In some embodiments, a system supports different types of voice-enabled devices, and each device has a device profile, which acts as a user profile). Some devices have female-gendered TTS voice parameters and other devices have male-gendered TTS voice parameters. As a result, the system guides users of the different devices to have the system designer's desired expectations of the devices' behaviors.

Note that TTS voice parameters are specifically parameters that can affect a listener's perceived nature of a voice such that it enables listeners to distinguish between different voices. Some system parameters, volume (gain control) in particular, are useful for adaptation in various applications, but they affect the speech audio output of speech synthesis module 201. They are not TTS voice parameters per se, although in a noisy environment, the choice of a signal-to-noise ratio (SNR) is such a parameter, and some embodiments pass that parameter to a gain control unit, which sets the volume relative to the average noise volume. Though a higher volume is preferable for older users, it is does not affect the perceived nature of the voice. In contrast, some embodiments support TTS parameters that define the relative amplitudes of different formants or different ranges of frequency spectra. Such parameters are TTS voice parameters.

Feedback and Experimentation

Some embodiments attempt to optimize TTS voice parameters for the maximum satisfaction of listeners. For example, many listeners prefer to hear a voice that uses a familiar dialect. Many male listeners prefer to hear a relatively high pitch female voice from speech-enabled devices, whereas many female listeners prefer a male voice or a relatively low-pitched female voice from speech-enabled devices. In those cases, the improved set of TTS voice parameters is different for different user profiles.

Some embodiments attempt to improve TTS voice parameters for purposes other than maximizing satisfaction of listeners, such as maximizing the likelihood that the user will make a purchase in response to an advertisement (ad conversion). In some situations, at coarse granularity, the TTS voice parameter values that increase user satisfaction also increase ad conversion. However, in some situations, at coarse granularity, and always at fine granularity, the TTS voice parameter values that maximize ad conversion are not the same as those that maximize user satisfaction. For example, some listeners are more likely to follow the purchase advice of an advertisement if delivered in a deeper voice than the listener would find most comfortable.

In some embodiments, functions, such as function 406 in FIG. 4, compute TTS voice parameter output from one or more inputs. In some embodiments, functions compute their TTS voice parameter output by using a model having specified rule-based algorithms coded by a developer. In some embodiments, functions compute their TTS parameter output by using a model that they train by machine learning (ML). Some ML embodiments train a model from a training set. Some ML embodiments update a model dynamically, and thereby adapt continuously during the operation of the system.

Some embodiments improve TTS voice parameters for a particular user profiles by experimentation. Some embodiments do so by AB testing. Some embodiments use algorithms of multivariable optimization that are more complex, such as open source or proprietary linear equation solvers, where each TTS voice parameter is a variable.

Some embodiments perform multiple experiments across various speech utterances for a single listener. Some embodiments perform multiple experiments across speech utterances directed at a large number of listeners. Thereby, such embodiments use crowdsourcing for the generation of experimental results. In either case, some embodiments make only fine-grained experimental variations, and collect data across a large number of utterances. Making coarse-grained variations to a machine voice, such that any particular user perceives it as having more than one voice, cause perceptions of awkwardness that would mask useful experimental results.

Figure 5:
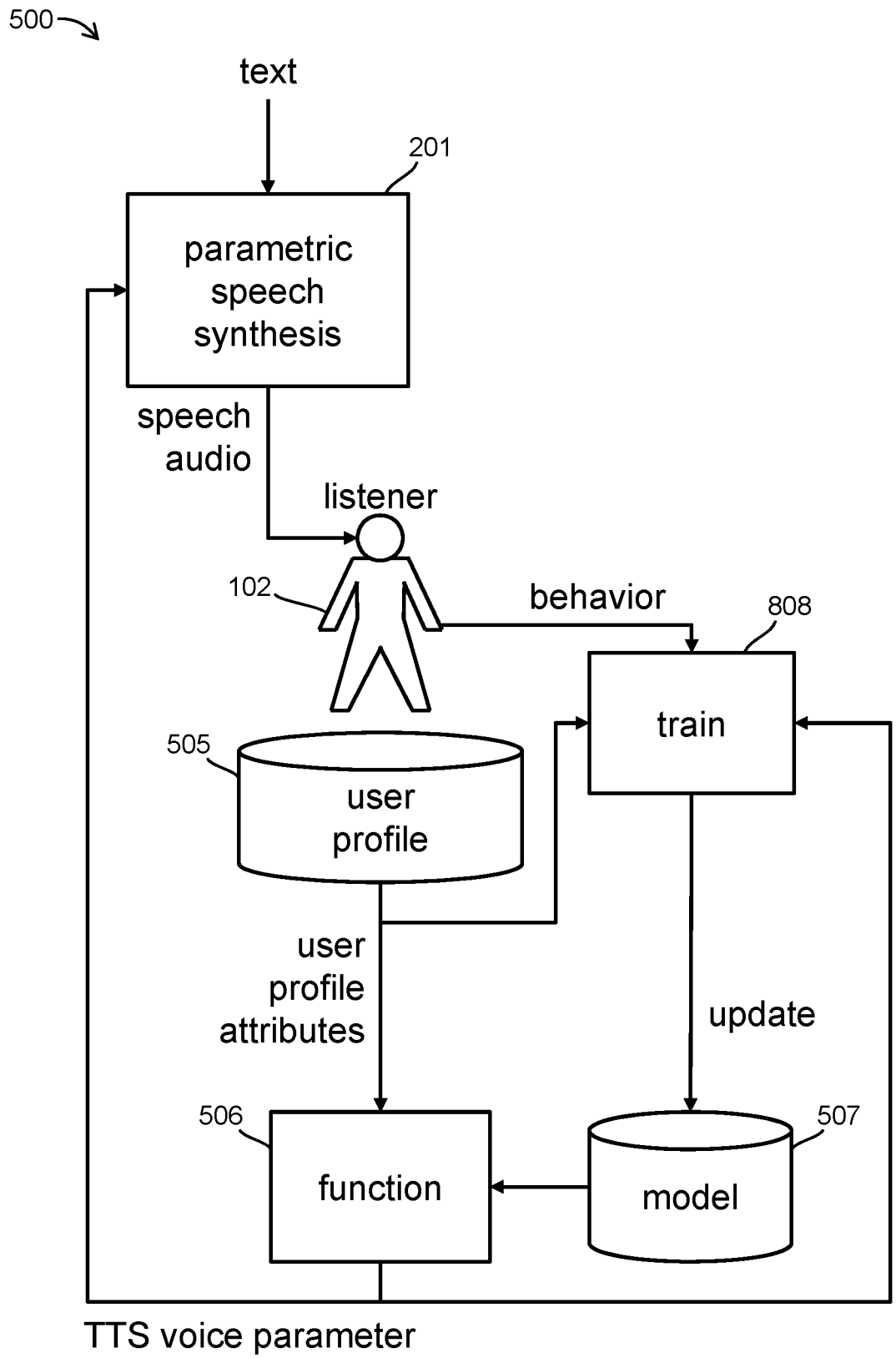
FIG. 5 illustrates modifying parameters for parametric speech synthesis responsive to listener behavior.
Figure 14:
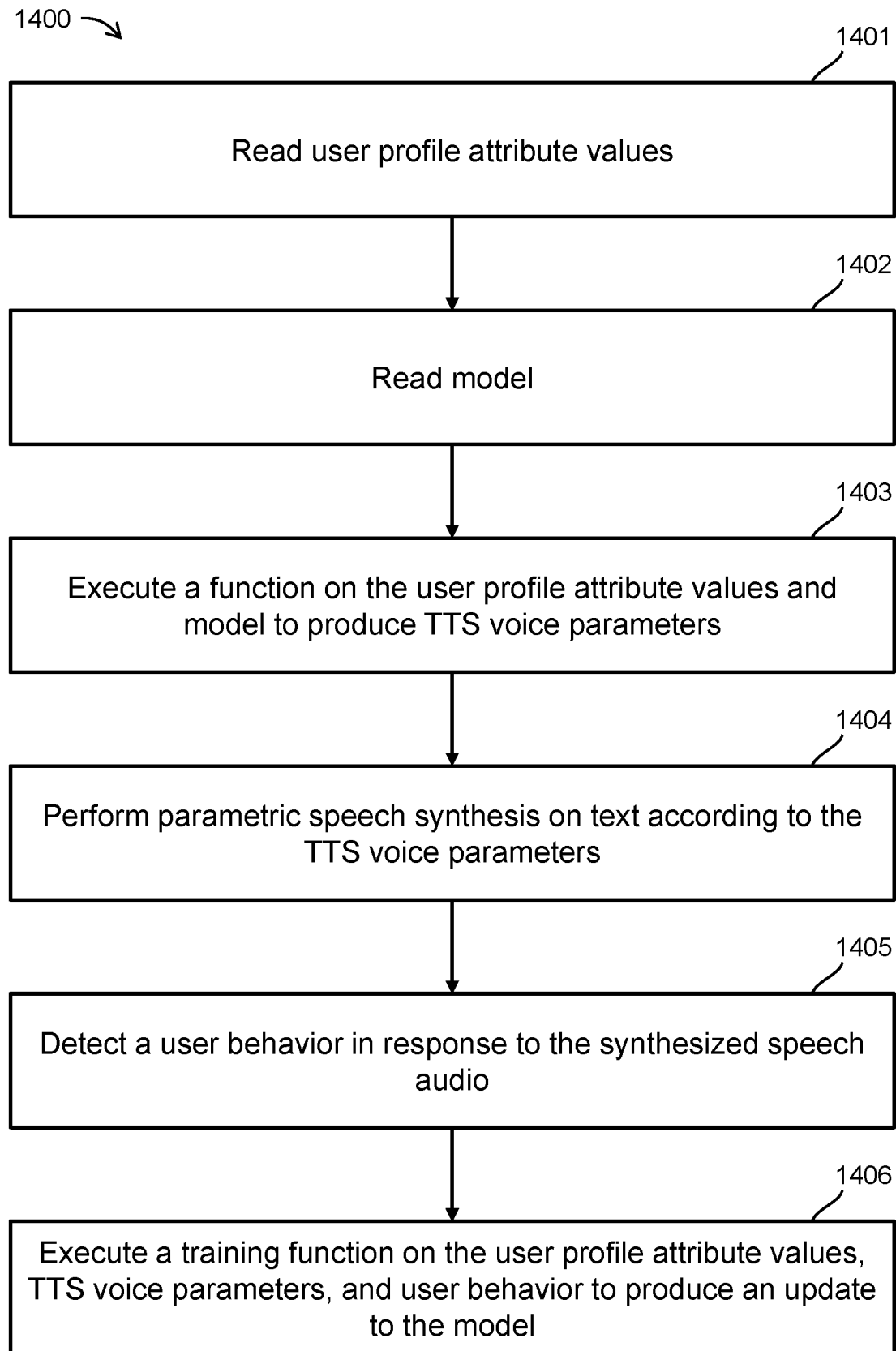
FIG. 14 illustrates a process for training a model of user profile attributes in response to user behavior, as affected by variations in TTS voice parameters.

Measuring user behavior improves performance of TTS parameters. FIG. 5 shows such an embodiment of a speech system 500 and its operation. A parametric speech synthesis module 201 consumes input text and, according to a set of TTS voice parameters, produces speech audio for a listener 102. A function module 506 produces the TTS voice parameters. The function does so by transforming user profile attributes from a user profile 505 according to a model 507. In the embodiment of FIG. 5, model 507 is a trained model. FIG. 14 shows a process 1400 of using the embodiments of FIG. 5. First, the system reads user profile attribute values 1401. Next, the system reads the model 1402. Next, the system executes a function on the user profile attribute values and model to produce TTS voice parameters 1403. Next, the system performs parametric speech synthesis on text according to the TTS voice parameters 1404. Next, the system detects a user behavior in response to the synthesized speech audio 1405. Finally, the system executes a training function on the user profile attribute values, TTS voice parameters, and user behavior to produce an update to the model.

After the parametric speech synthesis module 201 produces a speech audio response, the system observes a resulting user behavior. Some embodiments assign to the resulting behavior a worth value, such as a number between 0 and 1. A worth value indicates a degree of desirability of the behavior. In some embodiments, the system detects a desirable behavior, such as clicking on an ad; the worth value is 1. In some embodiments, the system detects that a desirable behavior did not occur, within a certain period of time, and treats the absence of a desirable behavior as an undesirable behavior; the worth value is 0. The training module 508 receives as input a behavior, a worth value, user profile attributes and TTS voice parameters. This collected input is a training sample for the trained model 507, and model 507 is updated accordingly. Thereby, a feedback loop improves the TTS voice parameters that the function module 506 produces.

Some embodiments maintain a stored model. For each utterance, they read the stored parameters, make certain changes to one or more parameters, and then, if they detect the desired behavior, store the changed set of parameters. If the desired behavior did not occur, the system discards the changed parameters. Some systems change parameters randomly in very small ways, and allow the parameter set to evolve gradually by natural selection. Some embodiments use systematic walks over certain ranges of each parameter in sequence. Some embodiments change groups of parameters together, and train the model 507 over large numbers of utterances in order to avoid local maxima or minima within the parameter state space.

Various embodiments incorporate machine learning within the measurement module 508 and between the measurements module 508 and the stored model 507.

Examples of Behavior Measurements

Different embodiments with different purposes or different target industries use different means of capturing user behavior after the system synthesizes TTS text and outputs the audio to the user. For example: systems that provide clickable ads detect whether a listener clicks an ad before a specific period of time; mobile phone software-based systems detect which app a user opens next; piloted airplanes measure the reaction time before a pilot follows an instruction in the utterance; shopping assistants measure the number of items and total amount of money spent by a shopper; child attendant systems measure the level and type of activity of children. By testing thousands of small TTS voice parameter variations across millions of utterances it is possible to fine tune the improved TTS voice parameters to cause listeners that fit a particular user profile to click any particular ad.

A system that reads bedtime stories to children detects how long it takes children to fall asleep. A system designed to report information to airplane pilots detects how often pilots fall asleep during long flights. A system that teaches massively open online courses measures student success rates on quizzes. A virtual assistant that responds to user queries measures the effectiveness of its responses by detecting when users do not follow with similar queries.

Adaptation Based on Situation

Sometimes it is useful to have different TTS voice parameters in different situations, even for the same user profile. This is especially true for speech synthesis in mobile devices, such as phones, vehicles, and robots. It is also true for stationary devices for which situations change over time, such as dynamic billboards, information kiosks, and music players. Generally, speech-enabled systems use sensors to detect situational attributes.

Figure 6:
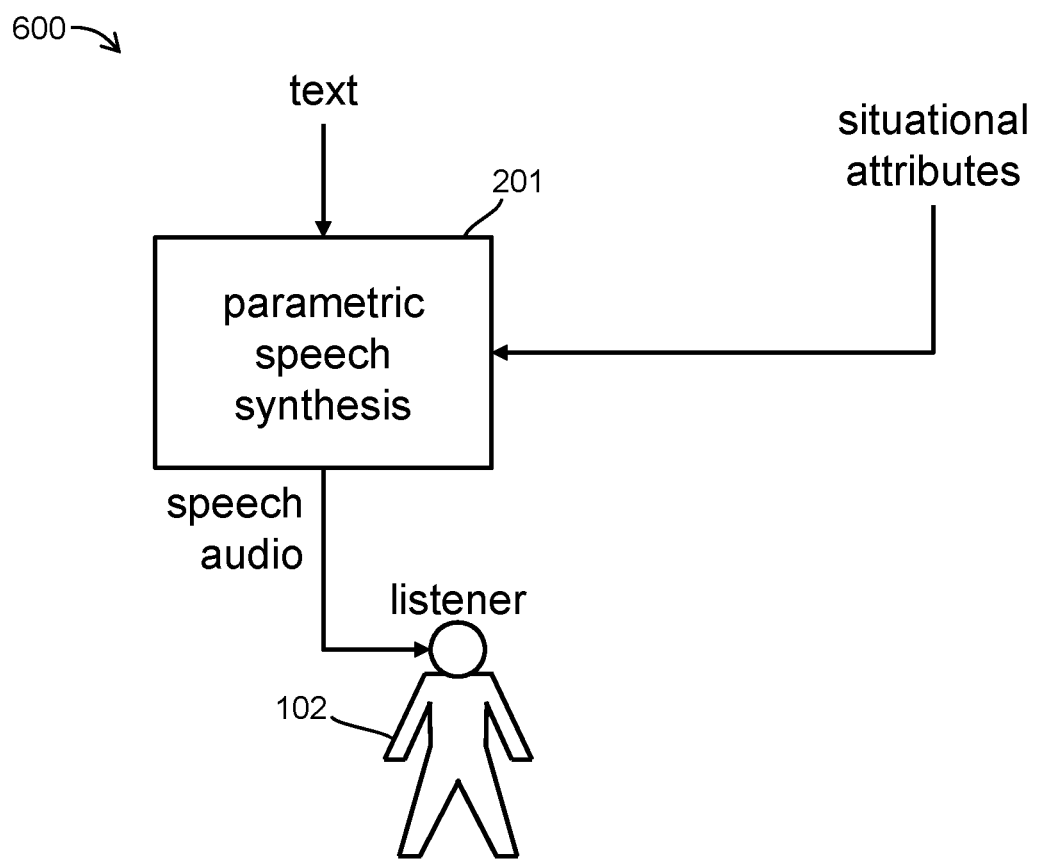
FIG. 6 illustrates parametric speech synthesis responsive to situational attributes.

Such systems detect situational attributes and map them to TTS voice parameters. Some embodiments accept such situation attributes to adapt speech synthesis. FIG. 6 shows such an embodiment of a speech system 600 and its operation. A parametric speech synthesis module 201 consumes input text and, according to a set of TTS voice parameters, produces speech audio for a listener 102. The TTS voice parameters are situational attributes.

Some phones, vehicles, and music players use microphones to detect ambient noise levels and assign TTS voice parameter values to deepen the voice by lowering the low frequencies. Some vehicles and robots use image and vision processing to detect the number of people present and their identities and assign TTS voice parameter values that the present users prefer and to which they respond more. For example, children respond more to high-pitched voices, and ones that are more melodic. Some dynamic billboards use internal clocks and time sync signals to detect the time of day and assign TTS voice parameters for faster speech rate during morning and work hours, but a slower speech rate during relaxing evening hours. Some information kiosks measure usage frequency to detect busyness and assign TTS voice parameters for a high level of arousal when usage is frequent. Some music players identify the genre of music playing in order to detect the type of mood and listeners likely to be present and assign TTS voice parameters for with a resonance to match the style and particular piece of music.

Some embodiments provide behavior measurement and model training, as described above in the feedback and experimentation section, in order to determine which voice attributes are most useful for each situation. Experimentation will likely find, for example, that a level of enunciation that would sound awkward in a quiet environment improves understandability by listeners in a situation with a high noise level, affecting the measure of worth. Many other model experiments involving situational attributes are possible.

Figure 7:
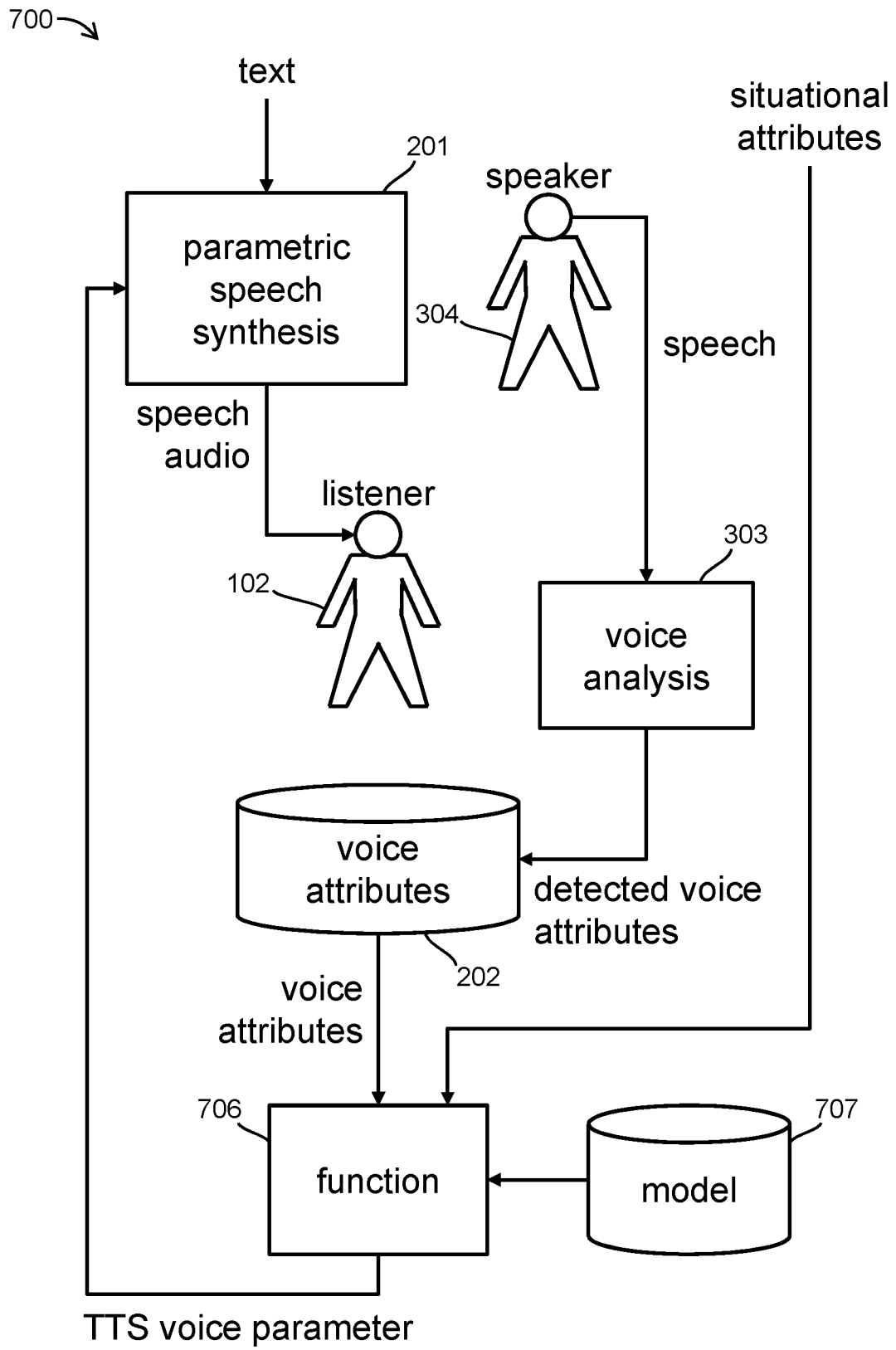
FIG. 7 illustrates parametric speech synthesis responsive to situational attributes and analysis of a speaker's voice.

Speaker voices change from one situation to another. Speaker voice analysis can provide useful information for determination of suitable TTS voice parameters in combination with situational attributes. Some embodiments perform voice analysis on ambient speakers. Some embodiments perform voice analysis on a single person who is both a speaker and a listener interacting with the system. FIG. 7 shows such an embodiment of a speech system 700 and its operation. A parametric speech synthesis module 201 consumes input text and, according to a set of TTS voice parameters, produces speech audio for a listener 102. A function module 706 produces the TTS voice parameters. The function does so by transforming user situational attributes according to a model 707. In various embodiments, model 707 is a specified model, a fixed trained model, or an adaptable model. The function further takes in a set of voice attributes 202. The system assigns values of voice attributes to the set of voice attributes 202 by performing a voice analysis in a voice analysis module 303. The voice analysis produces detected voice attributes and consumes speech. The speech comes from a speaker 304.

Figure 15:
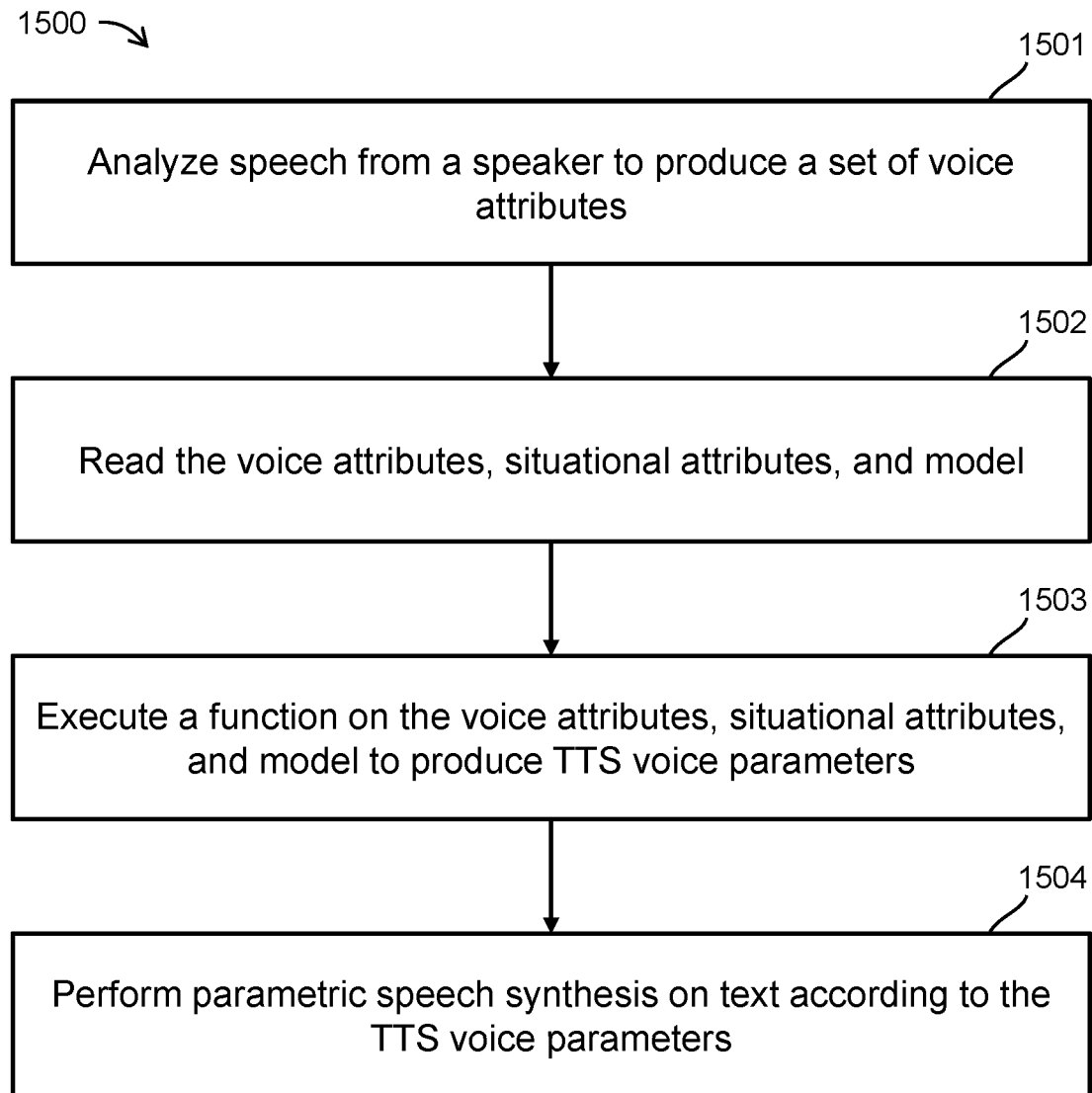
FIG. 15 illustrates a process for synthesizing speech according to a function of a model applied to a particular speaker's voice and situational attributes.

FIG. 15 shows a process 1500 of using the embodiments of FIG. 7. First, the system analyzes speech from a speaker to produce a set of voice attributes 1501. Next, the system reads the voice attributes, situational attributes, and model 1502. Next, the system executes a function on the voice attributes, situational attributes, and model to produce TTS voice parameters 1503. Finally, the system performs parametric speech synthesis on text according to the TTS voice parameters 1504.

Adaptation Based on Semantic Attributes

Sometimes it is useful to have different TTS voice parameters depending on the semantic attributes of the text. Some embodiments perform natural language processing on the text to extract semantic attributes. Some embodiments receive semantic attributes with the text. Some systems choose TTS voice parameters that are friendly and submissive when the text contains a question to the listener, but become slightly more authoritative when responding to a question, and more commanding when giving instructions.

Some embodiments, from which listeners expect to hear different voices, change the voice gender based on the domain of conversation. If the text regards the topic of bricklaying, such embodiments choose a male voice, whereas, if the text regards the topic of cosmetics, such embodiments choose a female voice.

Some embodiments adapt TTS parameters based on the proportion of proper nouns and uncommon words in the text. In particular, they increase articulation for such words. Some embodiments adapt TTS parameters based on the number of dependent clauses or the number of modifiers (adjectives and adverbs) in the text. In particular, they slow the rate of speech for such sentences. Some embodiments adapt TTS parameters based on the emotional charge in the text to be spoken. Some examples of emotional charge attributes include happiness, sadness, novelty, excitement, inquisitiveness, and certainty. For example, a happy tone is appropriate to announce the availability of a low-cost flight for certain desired dates, whereas a low tone is appropriate for responding with a failure. In the response "I am sorry, I found no flight under $500 for Sunday, but I have found one for Tuesday. Would you like that?" the first part uses a slightly sad tone, but the second part (starting at "but") uses a happy tone. An intelligent agent that constructs answers to a user and has a notion of failure or success in meeting her expectations converts such semantic distinctions into emotional attributes, which the TTS reflects. Some embodiments support sentences with contrastive emphasis, which adapt TTS for particular words indicate contrasting meanings. This affects prosody parameters. Consider the responses, "I did not find a flight for Sunday, but I have one for Tuesday!", with the words "not" and "Tuesday" emphasized and the response, "I didn't find a flight for Sunday, but I have one for Tuesday!", with the words "Sunday" and "Tuesday" emphasized.

Some embodiments that adapt TTS voice parameters based on semantic attributes are natural language (NL) based systems. Some embodiments use training to improve the effectiveness of synthesized speech on particular users or classes of users for particular expression semantics.

Figure 8:
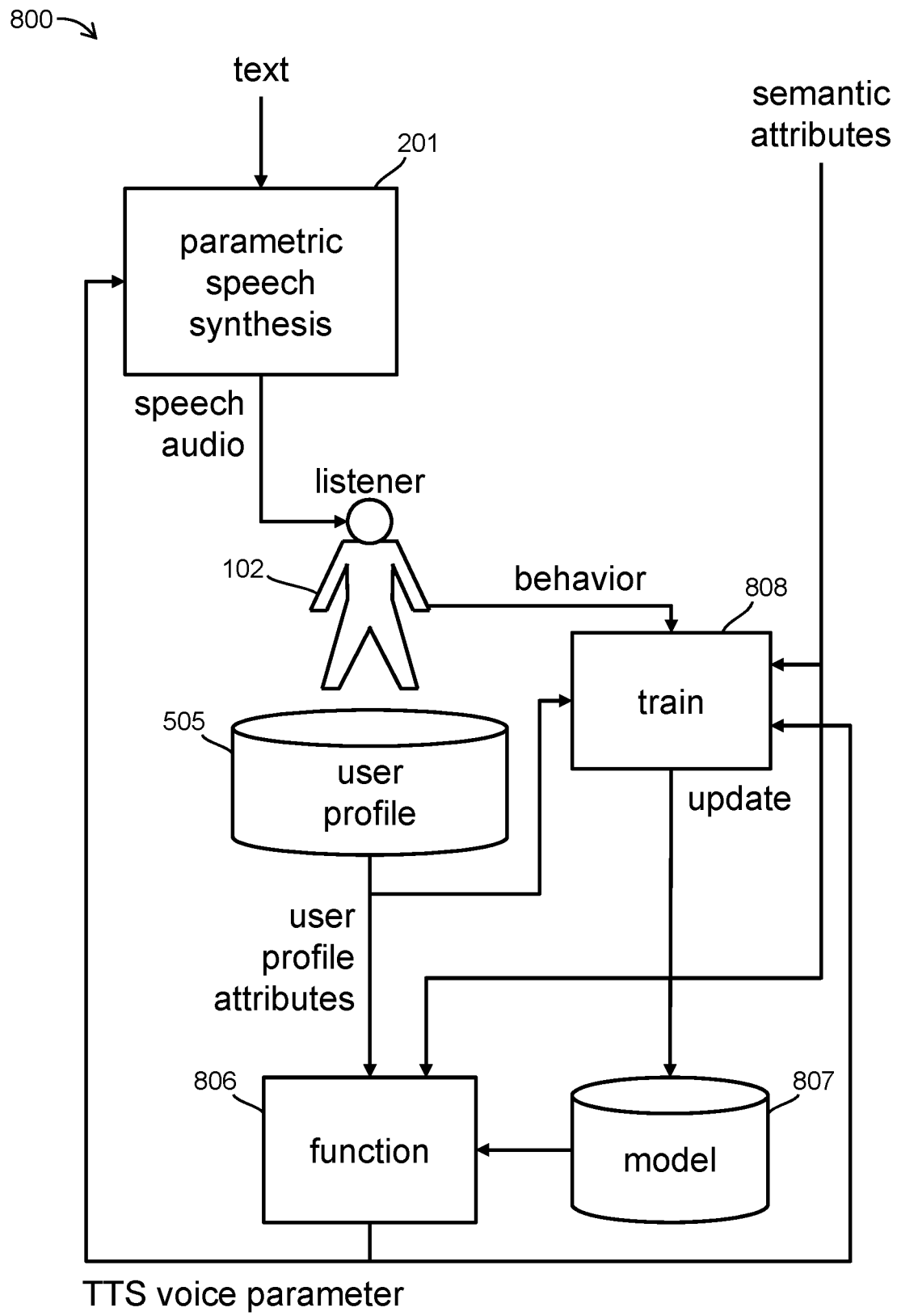
FIG. 8 illustrates modifying parametric speech synthesis responsive to listener behaviors and to semantics of natural language expressions.

FIG. 8 shows such an embodiment of a speech system 800 and its operation. A parametric speech synthesis module 201 consumes input text and, according to a set of TTS voice parameters, produces speech audio for a listener 102. A function module 806 produces the TTS voice parameters. The function does so by transforming both semantic attributes and attributes of a user profile 505 according to a model 807.

In the embodiment of FIG. 8, model 807 is adaptable. After the parametric speech synthesis module 201 produces speech audio, the system observes a responsive user behavior, or determines that a desirable behavior did not occur within a particular time period. The system 800 assigns a worth value to the behavior. The worth value, together with all the other dimensions of the training vector (user profile attributes, semantic attributes and TTS voice parameters) are training sample inputs to the training module 808. The training module 808, in response to the training samples, produces an update to the model 807. Thereby, a feedback loop improves the TTS voice parameters that the function module 806 produces for particular listeners hearing expressions with particular semantics.

Specified Models

Different embodiments with different purposes or different target industries use different functions to produce TTS voice parameters. For example, some function modules apply a quadratic equation of certain factors to an age user profile attribute in order to produce a speech rate TTS voice parameter. Experimentation eventually settles on a set of effective factors, which produce TTS parameters from the function that are slower for very young and very old listeners, but fastest for listeners in the 16 to 25 year old age range. A more advanced function for a dialect TTS voice parameter uses a home region user profile attributes, but scales that inversely by the speech rate parameter such that the dialect mimics that typical of the user profile home region most strongly for younger and older listeners, but allows greater dialect difference for middle-aged listeners.

FIG. 9 shows several examples of basic rules of specified models. FIG. 9(a) assigns a pitch parameter to value LOW if a user profile attribute, listener_gender, is FEAALE, otherwise sets the pitch parameter to HIGH. FIG. 9(b) assigns a first formant baseline frequency parameter, F1_freq_min, to 240-40*noise_level hertz. This deepens the voice, while maintaining the high frequencies that distinguish phonemes, when the situational noise attribute, noise_level, is high. FIG. 9(c) assigns a voice_gender TTS voice parameter to be MALE for a semantic attribute associated with the topic BRICKLAYING, otherwise assigns the voice_gender TTS voice parameter to FEMALE.

Machine Learning

Experienced system designers, with good intuition and thorough study, are able to create effective rules. However, particularly for numerical functions, machine algorithms applied to large experimental data sets can produce better rules and formulas across much larger numbers of simultaneous variables.

Some embodiments use machine learning (ML) techniques to estimate, for each utterance, improved TTS voice parameters. Many ML techniques are appropriate. They generally train by attempting to reduce a cost function to approximate optimal parameters. The trained model is a function F that takes as input observable behaviors, such as examples enumerated above, as a vector B=[b1 b2 . . . bN] and yields as output a TTS voice parameter vector P=[p1 p2 . . . pM], that is, P=F(B) that is tuned according to the vector B by the trained model. Some such embodiments set values of the vector B equal to a model associated with one or more of user profile attributes, situational attributes, voice attributes, and semantic attributes to train a model. The system uses the model as a predictor. Each pair of a measured behavior vector B resulting from a corresponding choice of a parameter vector P is a training pair. Such systems process the training pairs using a ML algorithm to find a prediction model F that reduces a cost function over the training set. The error is measured as the distance between the TTS voice parameters P and the predicted TTS voice parameters F(B).

In some embodiments, the error measure is the Euclidian distance (sum of squares). The error is the norm ∥P−F(B)∥ of the error vector P−F(B). The best model minimizes ∥P−F*(B)∥. Accordingly, the ML algorithm seeks to approach this best function F(B) and will at least reduce the error measure in most cases.

Various ML embodiments use multivariate linear regression, support vector machines, neural networks, and decision tree induction. Some ML embodiments are supervised, and apply past learning to new data. Some ML embodiments are unsupervised, and draw inferences from large datasets.

Physical Implementations

Various embodiments implement different combinations of components and method steps using software. Current general-purpose computer processors offer sufficient performance for all processing aspects in systems for a single or small number of simultaneous users. Server farms can be appropriate for some implementations. However, for large numbers of users, and in particular for enough users to gather statistically significant behavioral data to fine-grained tuning of a model, the data storage and processing requirements exceed what farms of general-purpose processor servers can practically accommodate.

To meet the demanding requirements of large-scale systems, some embodiments use processors with instruction sets and compilers optimized for machine learning algorithms. Some large-scale systems use distributed storage and processing architectures such as the open source Hadoop or other proprietary architectures. Some large-scale systems use field programmable gate array, application specific integrated circuit, or custom system-on-chip chips. Some such chips, or components of such chips, use hardwired logic that are not software programmable.

Most large-scale systems receive their configuration and control from remote computers over networks. Such systems do not have direct input and output interface such as keyboards, mice, displays, or touch screens. However, some such systems have processors, such as digital signal processors and multi-core processors. Some systems have non-transitory computer readable media such as solid-state storage device and Flash RAM. Some systems have transitory computer readable media such as Ethernet and PCI-Express connections.

Some embodiments are small-scale devices that support single users. Some such embodiments are specialized personal computers, mobile phones, tablets, virtual assistant devices, and household automatons. Some such devices have keyboards, mice, liquid crystal displays, touch screens, accelerometers, microphones, speakers, and gestural limbs.

Figure 10:
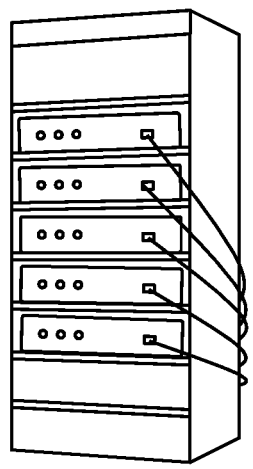
FIG. 10 illustrates example physical embodiments of the invention.
Figure 10:
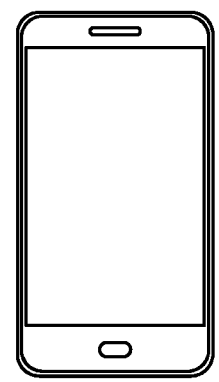
Figure 10:
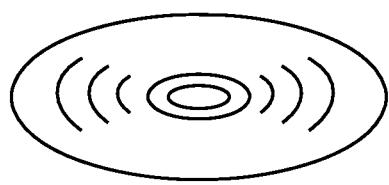
Figure 10:
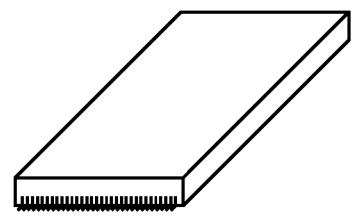
Figure 10:
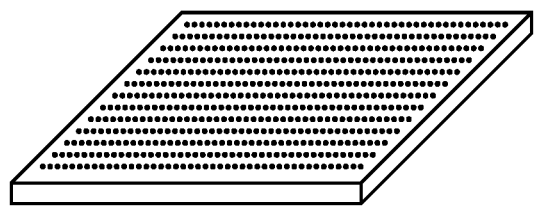
Figure 10:
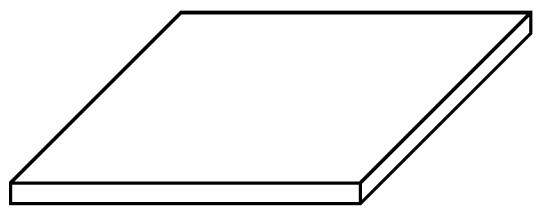

FIG. 10 shows some physical embodiments. FIG. 10(a) is a server farm. FIG. 10(b) is a mobile phone. FIG. 10(c) is a disk non-transitory computer readable medium. FIG. 10(d) is a Flash RAM non-transitory computer readable medium. FIG. 10(e) is the bottom side of a system-on-chip. FIG. 10(f) is the top side of a system-on-chip.

Figure 11:
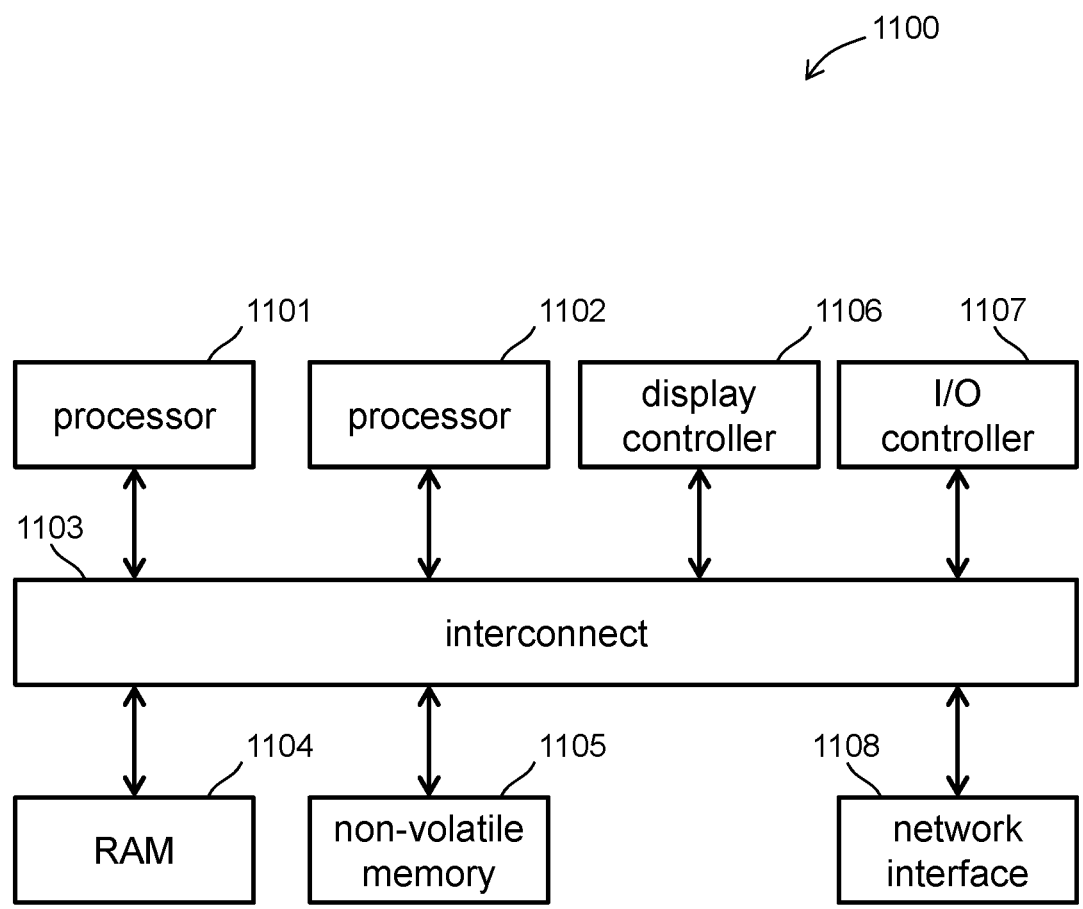
FIG. 11 illustrates a computer processing system according to an embodiment of the invention.

FIG. 11 shows a software-implemented embodiment that runs on computer processors. Computer system 1100 comprises parallel processors 1101 and 1102, which connect to interconnect 1103, through which the processors can execute software from instructions and operate on data stored in random access memory (RAM) 1104 and non-transitory, non-volatile memory 1105. Software running on computer system 1100 accesses the Internet through network interface 1108, provides a GUI through display controller 1106, and accepts user input through I/O controller 1107, all of which are also connected through interconnect 1103. In some embodiments, the processors are ARM instruction set processors. In some embodiments they are x86 processors. In some embodiments, memories, controllers, and interfaces are all on the same system-on-chip. In some embodiments, some elements are in different chips. In some embodiments, the non-volatile memory is a hard disk drive. In some embodiments, it is a solid-state drive. In some embodiments, the display controller connects to a local device display panel through a mobile industry processor interface (MIPI) display serial interface (DSI). In some embodiments, the display controller connects to a HDMI connector. In various embodiments, the I/O controller interfaces to touch screens, keyboards, mice, microphones, speakers, and USB connectors. In various embodiments, the network interface is an Ethernet cable interface, Wi-Fi interface, Bluetooth interface, and 5G LTE interface.

Various embodiments use suitable mapping functions on different combinations of user profile attributes, voice attributes, situational attributes, and semantic attributes to determine TTS voice parameters.

Examples given in this disclosure are illustrative and do not define the limits of the invention. Particular embodiments described in this disclosure are representative of various aspects of the invention, but are not the only reasonable embodiments. Ordinarily skilled practitioners in the art will recognize various alternative arrangements of the elements described and equivalents thereof.

What is claimed is:

1. A non-transitory computer readable medium storing code effective to cause one or more processors to:
    training a machine learning model according to first behaviors of a listener with respect to first synthesized audio signals including speech synthesized according to a plurality of values for a plurality of TTS parameters, the first behaviors including at least one of opening of an application, clicking on an advertisement, reaction time, and purchasing activity;
    apply the machine learning model to determine one or more selected values for the plurality of TTS parameters of a computer-based synthesized voice, the one or more parameters including at least one of level of arousal, authoritativeness, range, flutter, roughness, and breath;
    receive input text;
    synthesize speech audio for the input text, the synthesis depending on the one or more values for the one or more parameters; and
    output the speech audio to the listener.

2. The non-transitory computer readable medium of claim 1, wherein the non- transitory computer readable medium further stores code effective to cause one or more processors to:
    measure a second behavior responsive to speech synthesized according to the selected values of the plurality of TTS voice parameters;
    determine a difference between the first behaviors and the second behavior; and
    responsive to the difference, update the machine learning model.

3. The non-transitory computer readable medium of claim 1, wherein the plurality of TTS voice parameters further include at least one of: gender, age, and dialect.

4. The non-transitory computer readable medium of claim 1, wherein the plurality of TTS voice parameters further include at least one of: pitch, speech rate, and volume.

5. The non-transitory computer readable medium of claim 1, wherein the plurality of TTS voice parameters further include at least one of: formant frequency, formant bandwidth, formant amplitude, nasal pole frequency, nasal pole bandwidth, nasal zero frequency, and nasal zero bandwidth.

6. A method for configuring a parameter of a computer-based synthesized voice, the method comprising, by a computing device:
    measuring first behavior of a listener with respect to a plurality of text-to-speech voice parameters by evaluating behavior of the listener in response to first synthesized audio signals that are synthesized according to a plurality of values for the plurality of TTS voice parameters, the plurality of TTS voice parameters including at least one of level of arousal, authoritativeness, range, flutter, roughness, and breath and the first behavior including at least one of opening of an application, clicking on an advertisement, reaction time, and purchasing activity;
    training a machine learning model according to the first behavior of the listener with respect to the first synthesized audio signals;
    applying the machine learning model to determine selected values for the plurality of TTS voice parameters of a computer-based synthesized voice;
    receiving input text;
    synthesizing speech audio for the input text, the synthesizing depending on the selected values for the plurality of TTS voice parameters; and
    and
    output the speech audio to the listener.

7. The method of claim 6 further comprising:
measuring a second behavior responsive to speech synthesized according to the selected values of the plurality of TTS voice parameters;
determining a difference between the first behavior and the second behavior; and
responsive to the difference, updating the machine learning model.

8. The method of claim 6 wherein the plurality of TTS voice parameters further include at least one of: gender, age, and dialect.

9. The method of claim 6 wherein the plurality of TTS voice parameters further include at least one of: pitch, speech rate, and volume.

10. The method of claim 6 wherein the plurality of TTS voice parameters further include at least one of: formant frequency, formant bandwidth, formant amplitude, nasal pole frequency, nasal pole bandwidth, nasal zero frequency, and nasal zero bandwidth.

11. A non-transitory computer readable medium storing code effective to cause one or more processors to:
train a machine learning model to relate a plurality of text-to-speech (TTS) voice parameters and listener situations to observed listener behavior;
detect a current value of a situational attribute of a listener, the situational attribute being at least one of age of people present, and music that is playing;
responsive to the value of the situational attribute, determine selected values of the plurality of TTS voice parameters for a computer-based synthesized voice according to the machine learning model, wherein the TTS voice parameter is one of: TTS voice donor, level of arousal, authoritativeness, range, flutter, roughness, and breath;
synthesize text using the computer-based synthesized voice according to the values of the plurality of TTS voice parameters to obtain speech audio; and
output the speech audio to the listener.

12. A method of configuring a parameter of a computer-based synthesized voice, the method comprising, by a computing device:
training a machine learning model to relate a plurality of text-to-speech (TTS) voice parameters and listener situations to observed listener behavior;
detecting a current value of a situational attribute of a listener, the situational attribute being at least one of age of people present, and music that is playing; and
responsive to the value of the situational attribute, automatically configuring, according to the machine learning model applied to the value of the situational attribute, a value of a TTS voice parameter of the plurality of TTS voice parameters for the computer-based synthesized voice, wherein the TTS voice parameter is one of: TTS voice donor, level of arousal, authoritativeness, range, flutter, roughness, and breath;
synthesizing text using the computer-based synthesized voice according to the value of the TTS voice parameter to obtain speech audio; and
outputting the speech audio to the listener.

13. The method of claim 12 further comprising:
measuring a behavior of a listener responsive to speech synthesized according to the value of the TTS voice parameter; and
responsive to the behavior of the listener, updating the model.

14. The method of claim 12 further comprising:
measuring a first behavior responsive to speech synthesized according to the value of the TTS voice parameter;
automatically configuring a second value of the TTS voice parameter, according to the situational attribute and the machine learning model, the second value of the TTS voice parameter being different from the value of the TTS voice parameter;
measuring a second behavior responsive to speech synthesized according to the second value of the TTS voice parameter;
determining a difference between the first behavior and the second behavior; and
responsive to the difference, updating the machine learning model.

15. The method of claim 12 wherein the situational attribute is one of: location, noise, mood.

16. The method of claim 12, wherein the plurality of TTS voice parameters further include at least one of: gender, age, and dialect.

17. The method of claim 12, wherein the plurality of TTS voice parameters further include at least one of: pitch, speech rate, and volume.

18. The method of claim 12, wherein the plurality of TTS voice parameters further include at least one of: formant frequency, formant bandwidth, formant amplitude, nasal pole frequency, nasal pole bandwidth, nasal zero frequency, and nasal zero bandwidth.

19. A method of configuring a parameter of a computer-based synthesized voice, the method comprising:
training a machine learning model to relate a plurality of text-to-speech (TTS) parameters to user behavior and semantic attributes of text synthesized according to first values for the plurality of TTS parameters, the semantic attributes including at least one of a proportion of proper nouns, number of dependent clauses, number of modifiers, emotional charge;
determining a semantic attribute of a natural language expression; and
responsive to the semantic attribute, automatically configuring, according to the machine learning model applied to the semantic attribute, a selected value of a TTS voice parameter of the plurality of TTS parameters for the computer-based synthesized voice, wherein the TTS voice parameter is one of: TTS voice donor, level of arousal, authoritativeness, range, flutter, roughness, and breath;
converting the natural language expression to speech audio according to the value of the TTS voice parameter; and
outputting the speech audio.

20. The method of claim 19 further comprising:
measuring a behavior of a listener responsive to speech synthesized according to the value of the TTS voice parameter; and
responsive to the behavior of the listener, updating the machine learning model.

21. The method of claim 19 further comprising:
measuring a first behavior responsive to speech synthesized according to the value of the TTS voice parameter;
automatically configuring a second value of the TTS voice parameter, according to the machine learning model applied to the semantic attribute, the second value of the TTS voice parameter being different from the value of the TTS voice parameter;

measuring a second behavior responsive to speech synthesized according to the second value of the TTS voice parameter;

determining a difference between the first behavior and the second behavior; and responsive to the difference, updating the machine learning model.

22. The method of claim 19 wherein the semantic attribute indicates a domain of discourse.

23. The method of claim 19, wherein configuring the plurality of TTS voice parameters further including at least one of: gender, age, and dialect.

24. The method of claim 19, wherein the plurality of TTS voice parameters further include at least one of: pitch, speech rate, volume.

25. The method of claim 19 wherein the plurality of TTS voice parameters further include at least one of: formant frequency, formant bandwidth, formant amplitude, nasal pole frequency, nasal pole bandwidth, nasal zero frequency, and nasal zero bandwidth.

* * * * *